United States Patent
Kaufman et al.

(10) Patent No.: US 9,641,489 B1
(45) Date of Patent: May 2, 2017

(54) FRAUD DETECTION

(71) Applicant: EMC Corporation, Hopkinton, MA (US)

(72) Inventors: Alon Kaufman, Herut (IL); Philip Derbeko, Modiin (IL); Yan Belinky, Yokneam (IL)

(73) Assignee: EMC IP Holding Company, Hopkinton, MA (US)

( * ) Notice: Subject to any disclaimer, the term of this patent is extended or adjusted under 35 U.S.C. 154(b) by 71 days.

(21) Appl. No.: 14/870,308

(22) Filed: Sep. 30, 2015

(51) Int. Cl.
*H04L 9/00* (2006.01)
*H04L 29/06* (2006.01)

(52) U.S. Cl.
CPC .......... *H04L 63/0428* (2013.01); *H04L 9/008* (2013.01); *H04L 63/107* (2013.01); *H04L 2209/24* (2013.01)

(58) Field of Classification Search
CPC ..... H04L 63/00; H04L 63/0428; H04L 63/08; H04L 63/107; H04L 9/00; H04L 9/008; H04L 9/0866; H04L 9/0872; H04L 9/32
See application file for complete search history.

(56) References Cited

U.S. PATENT DOCUMENTS

| | | | | |
|---|---|---|---|---|
| 8,533,853 B2* | 9/2013 | Jones | ....................... | G06F 21/78 726/27 |
| 8,989,779 B1* | 3/2015 | Centore, III | .......... | H04W 4/021 455/456.1 |
| 9,420,429 B2* | 8/2016 | Segev | .................... | G01S 5/0027 |
| 2003/0108202 A1* | 6/2003 | Clapper | ................ | H04L 9/0872 380/258 |
| 2006/0107008 A1* | 5/2006 | Ghanem | ............. | G06F 12/1408 711/163 |
| 2010/0146299 A1* | 6/2010 | Swaminathan | ... | G06F 17/30666 713/189 |
| 2011/0311055 A1* | 12/2011 | Parann-Nissany | .... | G06F 21/602 380/278 |
| 2012/0106738 A1* | 5/2012 | Belenkiy | ............... | H04L 9/0872 380/270 |
| 2012/0324228 A1* | 12/2012 | Padhye | ................. | H04L 9/0869 713/176 |
| 2014/0155106 A1* | 6/2014 | Bombolowsky | ...... | H04W 4/028 455/456.6 |
| 2014/0173110 A1* | 6/2014 | Uetabira | ............... | H04W 12/08 709/225 |
| 2014/0304502 A1* | 10/2014 | Su | .......................... | H04W 4/02 713/154 |

(Continued)

FOREIGN PATENT DOCUMENTS

CH       EP 2670176 A1 * 12/2013   ............ H04W 4/028

*Primary Examiner* — Eric W Shepperd
(74) *Attorney, Agent, or Firm* — Krishnendu Gupta; Jason A. Reyes (57) ABSTRACT

Disclosed herein are techniques for use in fraud detection. In one embodiment, the techniques comprise a method. The method comprises receiving an encrypted current location associated with a user. The method also comprises obtaining an encrypted historical location associated with the user and an encrypted location sensitivity metric that relates to a distance within which locations are considered to be the same. The method further comprises performing an authentication operation based on the encrypted current location, the encrypted historical location and the encrypted location sensitivity metric.

15 Claims, 4 Drawing Sheets

(56) References Cited

U.S. PATENT DOCUMENTS

| | | | | |
|---|---|---|---|---|
| 2015/0038162 A1* | 2/2015 | Duleba | ............... | H04W 4/028 |
| | | | | 455/456.1 |
| 2015/0163226 A1* | 6/2015 | Kufluk | ................ | H04L 63/10 |
| | | | | 713/155 |
| 2015/0358333 A1* | 12/2015 | Cronin | ............... | H04L 63/0861 |
| | | | | 726/7 |
| 2016/0300389 A1* | 10/2016 | Glenn, III | ............ | G06T 19/006 |
| 2016/0358391 A1* | 12/2016 | Drako | ............... | G07C 9/00103 |

* cited by examiner

FRAUD DETECTION

TECHNICAL FIELD

The invention relates generally to the field of information technology (IT). More specifically, the invention relates to fraud detection.

BACKGROUND OF THE INVENTION

In today's high-tech, fast-paced, hyper-connected world, people are spending more and more time on the internet to complete more of their daily activities such as online banking and shopping. The convenience afforded by the access and availability of the online world is, however, not without drawbacks. This increased access has brought with it an unparalleled growth in online fraudulent activity.

Conventional approaches to fraud detection use a third party server to store historical login attempt data and generate risk scores based on the historical login attempt data. For example, when a web server of an online bank receives a login attempt that involves a user's account, the web server may send the features describing the login attempt (e.g., geolocation, login time, hostname, autonomous system number/name, country of origin) to the third party server. The third party server then inputs the features and the user's historical login attempt data into a risk model that outputs a risk score. The third party server sends the risk score to the web server so that the web server may grant or deny access to the user's account.

Unfortunately, there are deficiencies with the above-described conventional approaches to fraud detection. For example, there are potential liabilities that come with storing sensitive information such as historical login attempt data in the raw form needed as input into risk models. Along these lines, many clients of a third party fraud detection service would rather not send sensitive information in raw form. Further, certain regulations prohibit the export of such sensitive information to third parties.

One way to address this issue is to have a client of the third party service encrypt the data. In fact, there are methods by which data analytics queries may be performed on encrypted data, such as fully homomorphic encryption. However, the large scale of the computations involved in a typical data analytics query makes performing queries on fully encrypted query data complex.

It is, therefore, necessary to reduce the complexity involved in the processing of encrypted data while at the same time maintaining confidence that the results of such processing can be relied on to detect fraud.

SUMMARY OF THE INVENTION

There is disclosed a method for use in fraud detection, comprising: receiving an encrypted current location associated with a user; obtaining an encrypted historical location associated with the user and an encrypted location sensitivity metric, wherein location sensitivity metric relates to a distance within which locations are considered to be the same; and performing an authentication operation based on the encrypted current location, the encrypted historical location and the encrypted location sensitivity metric.

There is also disclosed an apparatus for use in fraud detection, comprising: memory; and control circuitry coupled to the memory, the memory storing instructions which, when carried out by the control circuitry, cause the control circuitry to: receive an encrypted current location associated with a user; obtain an encrypted historical location associated with the user and an encrypted location sensitivity metric, wherein location sensitivity metric relates to a distance within which locations are considered to be the same; and perform an authentication operation based on the encrypted current location, the encrypted historical location and the encrypted location sensitivity metric.

There is further disclosed a computer program product having a non-transitory computer readable medium which stores a set of instructions for use in fraud detection, the set of instructions, when carried out by computerized circuitry, causing the computerized circuitry to perform a method of: receiving an encrypted current location associated with a user; obtaining an encrypted historical location associated with the user and an encrypted location sensitivity metric, wherein location sensitivity metric relates to a distance within which locations are considered to be the same; and performing an authentication operation based on the encrypted current location, the encrypted historical location and the encrypted location sensitivity metric.

BRIEF DESCRIPTION OF THE DRAWING

The invention will be more clearly understood from the following description of preferred embodiments thereof, which are given by way of examples only, with reference to the accompanying drawings, in which.

DETAILED DESCRIPTION

This technique described herein relates to fraud detection and a privacy-preserving, location-based authentication service for mobile devices. In a particular example, a user enrolls with a server and activates location authentication application. The user defines a private encryption key that is known only to the user. The key will be used for homomorphic encryption scheme. The user defines location sensitivity, i.e. locations within 100 meter radius are the same. The application encrypts sensitivity distance using addictive and order preserving homomorphic encryption and sends it to the server. The application periodically sends user location encrypted using the private key to the server. The server receives the location and checks whether the location is nearby previous locations, using location sensitivity previously provided by the user. The locations are then saved by the server, which calculates "common places", i.e. locations where the user is usually located. This mechanism can be used for changing the strength of authentication mechanisms according to user location (is user located at a common place or not). To do that, it is necessary to query whether the last location report of the user is near his "common place". If it is not, then additional authentication mechanisms are required.

Advantageously, this technique has the following properties. Only the user is aware of the encryption key and only the user has access to his locations. Location sensitivity method allows location service to have certain flexibility with respect to user location. Moreover, it is possible to change the sensitivity at any point of time. Different encryption key for each user limits the impact of a possible breach. Stealing a key of a user will not provide access to locations of other users. Calculations on encrypted data are performed by location service saving mobile battery.

Figure 1:
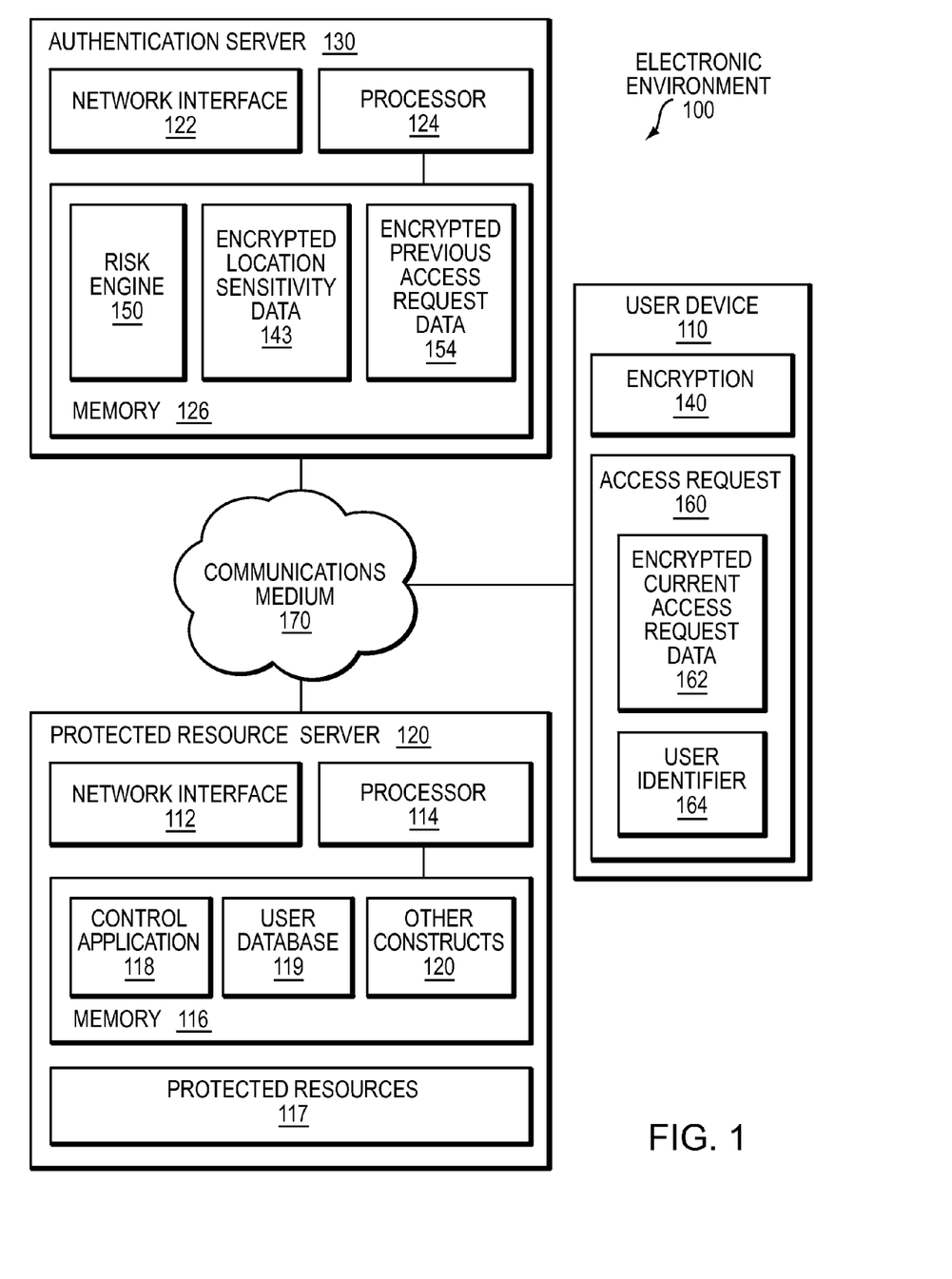
FIG. 1 is a block diagram illustrating an example electronic environment in which the improved technique can be carried out.

FIG. 1 shows an example electronic environment 100 in which the improved technique can be carried out. The electronic environment 100 includes a user device 110, a protected resource server 120, an authentication server 130, and a communications medium 170.

The user device 110 is any electronic device from which a person may submit an access request 160 over the communications medium 170 to access protected resources 117 controlled by the protected resource server 120. As illustrated, the access request 160 includes encrypted current access request data 162 (i.e., encrypted current location data) and a user identifier 164. In this particular embodiment, it should be understood that the user device 110 comprises an encryption module 140 that encrypts current access request data to form the encrypted current access request data 162 (e.g., homomorphic encryption). A suitable user device includes a desktop computer, a laptop computer, tablet computer, smartphone, smart watch, or the like.

The protected resource server 120 is constructed and arranged to process a large number of access requests 160 to access protected resources 117. The protected resources 117 may include any types of resources that are protectable via electronic security. For example, the protected resource server 120 may be an online financial institution (e.g., an online bank, an online brokerage service, etc.) and the protected resources 117 may include access to a user account, access to protected financial data, the ability to complete online transactions, etc. Additionally, the protected resource server 120 may be an online store (e.g., an online retailer, an online auction site, etc.) and the protected resources 117 may include the ability to complete online purchases, the ability to download online content such as books, music, movies, etc. Furthermore, the protected resource server 120 may operate as a portal or a gateway, and the protected resource may include access via that portal (e.g., VPN access, corporate intranet access, access to a remote file server, etc.), and so on.

As illustrated in FIG. 1, the protected resource server 120 includes a network interface 112, processor 114, memory 116, and protected resources 117, among other things. The memory 116 includes a set of software constructs including a control application 118, a user database 119, and other constructs 120.

The network interface 112 is constructed and arranged to connect the protected resource server 120 to the communications medium 170. For example, the network interface 112 may include a network adapter to connect to a public network such as the Internet, a wireless network router to offer wireless connectivity to users, and so on. Accordingly, the network interface 112 enables the protected resource server 120 to communicate with the other components of the electronic environment 100 including the user device 110 and the authentication server 130.

The memory 116 is intended to represent both volatile memory (e.g., DRAM, SRAM, etc.) and non-volatile memory (e.g., flash storage units, magnetic disk drives, etc.). The control application 118 controls the operation of the protected resource server 120. The user database 119 includes user entries for valid users. The other constructs 120 represent the operating system, metadata to manage exchanges between the authentication server 130 and the user device 110, metadata to track user access of the protected resources 117, etc. The other constructs 120 may further include drivers, utilities and tools, user-level applications, GUIs, and so on.

The processor 114 is constructed and arranged to manage user access to the protected resources 117. In particular, the processor 114 when operating in accordance with the control application 118 performs validation operations, communicates with the authentication server 130 to effectuate authentication, and controls access to the protected resources 117.

The authentication server 130 is constructed and arranged to support the operation of the protected resource server 120 by performing authentication operations on request. That is, the authentication server 130 provides the results of the authentication operations to the protected resource server 120, and the protected resource server grants access to the protected resource 117 when authentication is successful. Accordingly, the protected resource server 120 and the authentication server 130 work cooperatively and can be viewed as server-side equipment from the perspective of the user device 110.

The authentication server 130 includes a network interface 122, processor 124, and memory 126, among other things. The memory 126 includes encrypted previous access request data 154, encrypted location sensitivity data 143 and a risk engine 150 that enables computation of risk scores according to the encrypted previous access request data 154, the encrypted location sensitivity data 143 and the encrypted current access request data 162.

The network interface 122 is constructed and arranged to connect the authentication server 130 to the communications medium 170. For example, the network interface 122 may include a network adapter or dedicated communications pathway thus providing electronic connectivity to the protected resource server 120.

The memory 126 is intended to represent both volatile memory (e.g., DRAM, SRAM, etc.) and non-volatile memory (e.g., flash storage units, magnetic disk drives, etc.). As discussed, the memory 126 is constructed and arranged to store various encrypted data (143,154). The memory 126 is further constructed and arranged to store a variety of software constructs realized in the form of executable instructions, such as risk engine 150. When the executable instructions are run by the processor 124, the processor 124 is caused to carry out the operations of the software constructs. Although certain software constructs are specifically shown and described, it should be understood that the memory 126 typically includes many other software constructs, which are not shown, such as an operating system, various applications, processes, and daemons, for example.

The processor 124 includes one or more processing chips and/or assemblies. As should be understood from the foregoing, the processor 124 and the memory 126 together form control circuitry constructed and arranged to carry out various functions. For example, performing an authentication operation that determines risk associated with access requests.

The communications medium 170 connects the various components of the electronic environment 100 together to enable the various components to exchange electronic signals. At least a portion of the communications medium 170 is illustrated as a cloud to indicate that the communications medium 170 is capable of having a variety of different topologies including backbone, hub-and-spoke, loop, irregular, combinations thereof, and so on. Along these lines, the communications medium 170 may include copper-based data communications devices and cabling, fiber optic devices and cabling, wireless devices, combinations thereof, etc. Furthermore, the communications medium 170 is capable of supporting LAN-based communications, SAN-based communications, or combinations thereof.

During operation, if a user seeks enrollment with the protected resource server 120, the encryption module 140 of the user device 110 generates an encryption key specific to the user device 110 for encrypting location data of the user device 110. This encrypted data is then submitted by the user device 110 to a protection resource server 120 which in turn forwards the encrypted data to the authentication server 130. Alternatively, the user device 110 may submit the encrypted data direct to the authentication server 130. It should be understood that in this embodiment the encrypted data is represented as encrypted previous access request data 154 stored in the authentication server 130. The encryption key is also used to encrypt location sensitivity data provided by the user of the user device 110. For example, the location sensitivity data may state that any two locations within 100 meters of one another are to be considered the same. This encrypted data is represented by encrypted location sensitivity data 143 in the authentication server 130.

Next, the user device 110 submits an access request 160 to the protected resource server 120 seeking access to the protected resources 117 controlled by the protected resource server 120. In this particular embodiment, the access request 160 comprises current access request data (i.e., current location data) 162 encrypted by the encryption module 170 and a user identifier 164.

The protected resource server 120 receives the access request 160 from the user device 110 over the communications medium 170. The server 120 stores the request 160 locally and performs a number of operations. For example, when the server 120 is operated by an online bank, the request 160 may include a username identifying an account or accounts to be accessed and a password ostensibly proving that the owner of the account(s) is the person that submitted the request. However, an adversary may have stolen the owner's credentials and is now attempting to impersonate the owner. The server 120 is, therefore, configured to first check the username and password, and then send the encrypted data 162 to the authentication server 130 to assess the risk associated with the access request 160.

Upon receiving the encrypted data 162, the authentication server 130 performs an authentication operation to assess the risk associated with the access request 160. The authentication operation comprises a number of steps. First, the authentication server 130 retrieves the encrypted location sensitivity data 143 and the encrypted previous access request data 154. The authentication server 120 then determines, via the risk engine 150, the risk associated with the access request 160 based on (i) the encrypted previous access request data 154, (ii) the encrypted location sensitivity data 143 and (iii) the encrypted current access request data 162. Finally, the authentication server 130 outputs a risk score to the protected resource server 120. The server 120 may then grant or deny access to the protected resources 117 based on the generated risk score. Alternatively, the server 120 may opt to forward an authentication challenge in response to receiving the risk score. The server, as will be appreciated, will ultimately make a decision on how to proceed with the access request 160 based on the risk score.

Figure 2:
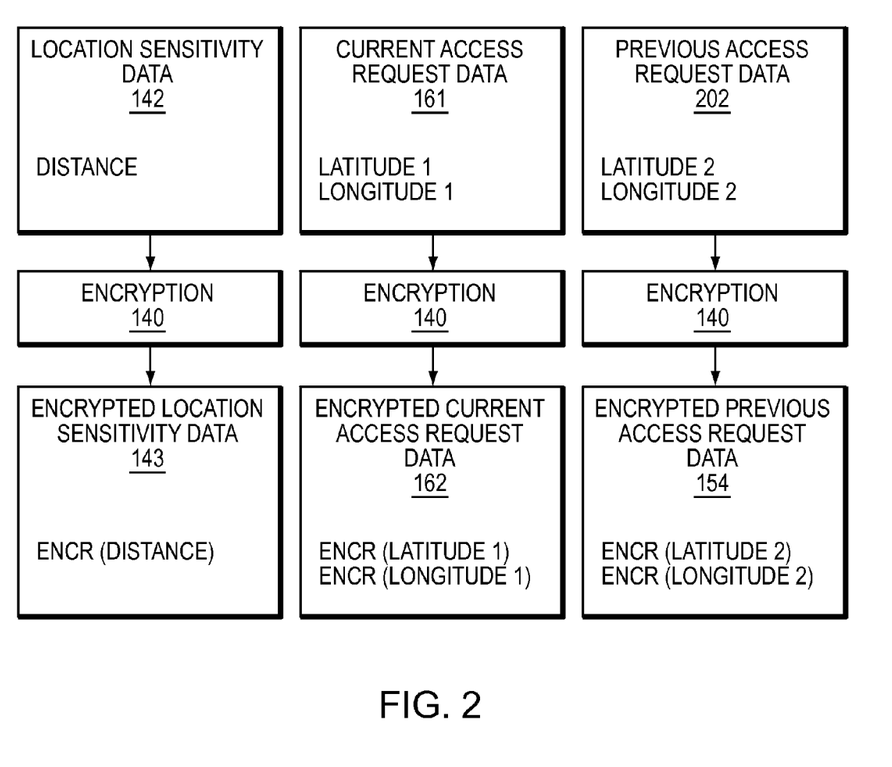
FIG. 2 is a block diagram illustrating an example of the steps involved in encrypting location sensitivity data, current access request data and previous access request data within the electronic environment illustrated in FIG. 1.
Figure 3:
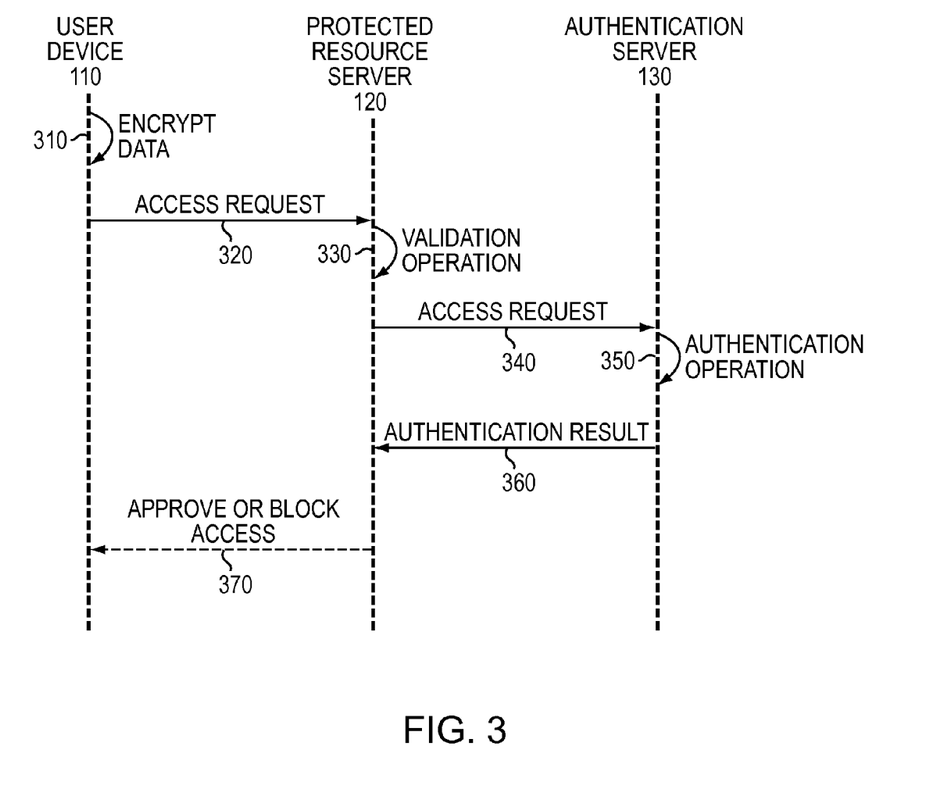
FIG. 3 is a sequence diagram illustrating example operations carried out by components within the electronic environment illustrated in FIG. 1.

FIGS. 2 and 3 provide a specific example of the above-described fraud detection process. In particular, FIG. 2 illustrates a specific example of location sensitivity data 142, current access request data 161 and previous access request data 202. In this example, the current access request data 161 contains specific values of features commonly used in fraud detection operations. The features in this example include the longitude and latitude of a geolocation of the user device 110 at the time at which the access request 160 was submitted ("Latitude1", "Longitude1").

The previous access request data 202 is stored in encrypted form in the authentication server 130 as the encrypted previous access request data 154. In raw form, the previous access request data 202 contains values of the same features as those presented in the current access request data 161, except the values in this case are denoted by the appendage of a "2" rather than a "1" as shown in the current access request data 161, i.e, "Latitude2", "Longitude2", and so on.

To form the encrypted previous access request data 154, the user device 110 encrypts the current access request data 202 using the encryption module 140. Moreover, the user device 110 encrypts the current access request data 161 using the encryption module 140 to produce the encrypted current access request data 162. Furthermore, the user device 110 encrypts location sensitivity data 142 using the encryption module 140.

FIG. 3 illustrates a sequence diagram representing an example process by which the components of the electronic environment 100 combine to perform fraud detection in response to the access request 160.

At 310, the user device 110 encrypts the current access data or current location data of the user device 110. It should be appreciated from above that the encryption module 140 of the user device 110 facilitates the encryption.

At step 320, the user device 110 sends an access request 160 to the protected resource server 120. The access request 160 as sent by the user device 110 comprises encrypted data 162 and user identifier 164.

At 330, the protected resource server 120 performs a validation operation. It should be understood that the validation operation comprises checking the user identifier 164 (e.g., username/password) against entries in the user database 119. If the user identifier is correct, the procedures proceed. If the user identifier is incorrect, the procedures may stop as this may be a sign that the access request 160 is fraudulent.

At 340, and in response to the validation operation being successful, the protected resource server 120 sends the access request data (or at least the current location data) to the authentication server 130.

At step 350, the authentication server 130 performs an authentication operation. As described above, the authentication operation comprises multiple steps including retrieving data (143, 154). The steps also including determining risk based on based on (i) the encrypted previous access request data 154, (ii) the encrypted location sensitivity data 143 and (iii) the encrypted current access request data 162. The steps also comprises outputting a risk score.

At step 360, the authentication server 130 sends an authentication result to the protected resource server 120. The authentication result comprising the risk score which indicates the risk associated with the access request 160.

At step 370, the protected resource server 120 approves or blocks access to the protected resources 117 based on the risk score. For example, if the risk score is greater or less than a threshold, the protected resource server 120 may decide whether to approve or block access. The protected resource server 120 may also be configured to strengthen authentication based on the risk score. For example, the protected resource server 120 may decide to issue a further authentication challenge (e.g., knowledge based challenge, out-of-band challenge, etc.) to user of the user device 110 based on the risk score.

Figure 4:
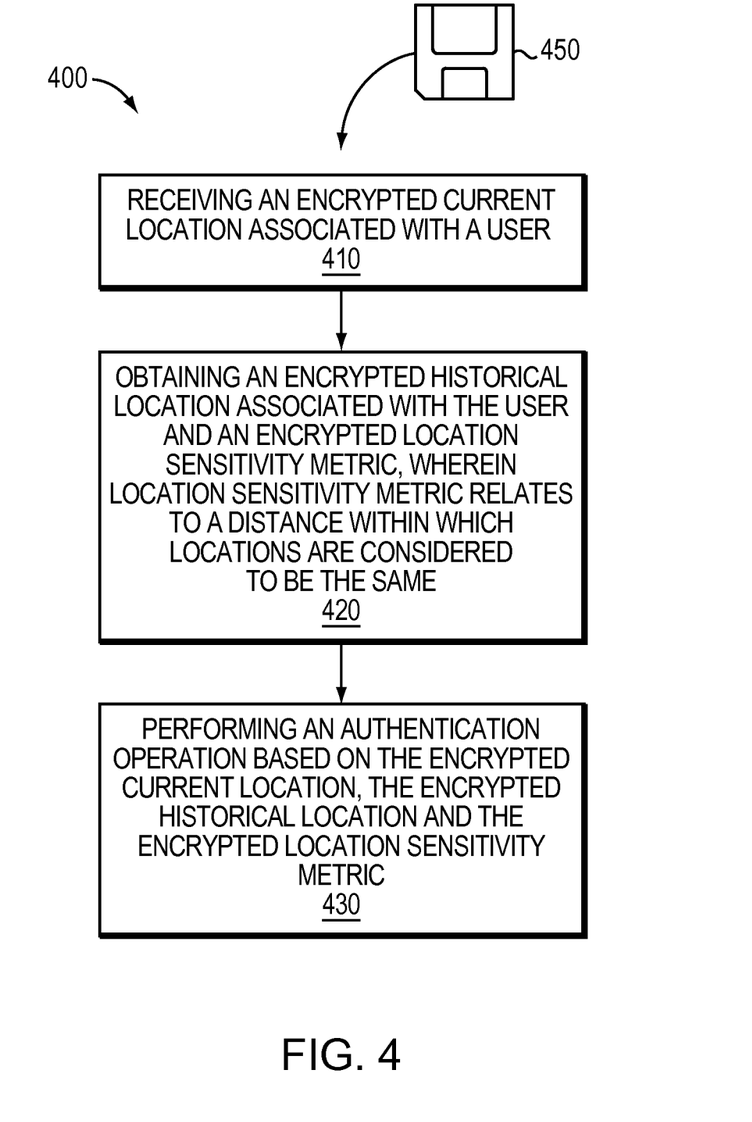
FIG. 4 is a flow chart illustrating a method of carrying out the improved technique within the electronic environment illustrated in FIG. 1.

FIG. 4 illustrates a method 400 for use in fraud detection. The method 400 may be performed by the software constructs described in connection with FIG. 1, which may reside in the memory 116 of the protected resource server 120 and/or the memory 126 of the authentication server 130 and are respectively run by the processors 114 and 124.

At step 410, the method comprises the step of receiving an encrypted current location associated with a user (e.g., user may be a person or thing or entity or device, etc.). At step 420, the method comprises the step of obtaining an encrypted historical location associated with the user and an encrypted location sensitivity metric that relates to a distance within which locations are considered to be the same (e.g., locations within 100 meters are the same). It should be understood that the current location, the historical location and the location sensitivity metric are encrypted by homomorphic encryption. At step 430, the method comprises performing an authentication operation based on the encrypted current location, the encrypted historical location and the encrypted location sensitivity metric.

In an example use case, the previous access request data, which comprises location coordinates X and Y (latitude, longitude), and the location sensitivity data K, define a square that comprise corner points ((X−K, Y−K) and (X+K, Y+K)). The current access request data comprises a point $(X_1, Y_1)$ that will be considered to be "close" to (X, Y) if it belongs to the square. It should be noted that the relationship is symmetric (i.e. if point A is close to point B, then point B is also close to point A).

It should be understood that for encrypted proximity calculation there is typically a need for 3 operations (i.e., "−", "+" and order (">")). However, an easier option may be deployed in which the square bounding points are calculated and then sent encrypted to the authentication server. In this case, there will be a need only for order operations.

It should be noted that order preserving encryption scheme is described in "Order-preserving symmetric encryption" (*In proceedings of the 28<sup>th</sup> annual international conference on theory and applications of Cryptographic Techniques*, April 2009 by Boldyreva, Chenette, Lee and O'Neill). It should also be noted that if extra protection is required then data in-transit should be transferred over encrypted channel.

In this case, once a new location point is sent, the authentication server will iterate over all previously known location points and check if the new point is close to any of them. If yes, then the counter of this point is increased. If not, then the new location is added to the list of previously known ones. In this way, the authentication server is able to determine common or usual locations by keeping track of the number of times the user was there. This means that there is a need for a count if the location was visited.

It should be further noted that the techniques as described herein may also use another encryption system that supports addition operation (e.g., Paillier scheme described in "*Public-key cryptosystems based on composite degree residuosity classes*" from 1999). In order to use that, the client will round all locations to a pre-defined value. For each location, the client will send the corners $((X_1, Y_1), (X_2, Y_2))$ of the square. In addition, it will send the encrypted value of a round-up value (L). When the client sends the new location, the server will do the following for each previously known location point:

Iterate over all points in the square by adding Encrypted (L) to X and Y. This step will iterate over K*K points. The addition is done using homomorpic scheme that supports sum.

If the current point equals to the received new point, add 1 to the previously known location point.

If not, then it is added to the list of the previously known locations.

Although features are shown and described with reference to particular embodiments hereof, such features may be included and hereby are included in any of the disclosed embodiments and their variants. Thus, it is understood that features disclosed in connection with any embodiment are included as variants of any other embodiment. Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 450 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method for use in fraud detection, comprising:
   receiving an encrypted current location associated with a user;
   obtaining an encrypted historical location associated with the user and an encrypted location sensitivity metric, wherein location sensitivity metric relates to a distance within which locations are considered to be the same; and
   performing an authentication operation based on the encrypted current location, the encrypted historical location and the encrypted location sensitivity metric using a homomorphic-based order operation.

2. The method as claimed in claim 1, wherein the current location, the historical location and the location sensitivity metric are encrypted by a homomorphic encryption scheme.

3. The method as claimed in claim 1, wherein performing the authentication operation comprises:
   determining whether the current location and the historical location are within the distance as defined by the location sensitivity metric.

4. The method as claimed in claim 1, wherein the historical location comprising location coordinates, and the location sensitivity metric comprising the distance, define a square; and
    wherein performing the authentication operation comprises:
        determining whether the current location is within the square.

5. The method as claimed in claim 1, wherein performing the authentication operation comprises determining a risk score and forwarding the risk score for use in authentication.

6. An apparatus for use in fraud detection, comprising:
    memory; and
    control circuitry coupled to the memory, the memory storing instructions which, when carried out by the control circuitry, cause the control circuitry to:
        receive an encrypted current location associated with a user;
        obtain an encrypted historical location associated with the user and an encrypted location sensitivity metric, wherein location sensitivity metric relates to a distance within which locations are considered to be the same; and
        perform an authentication operation based on the encrypted current location, the encrypted historical location and the encrypted location sensitivity metric using a homomorphic-based order operation.

7. The apparatus as claimed in claim 6, wherein the current location, the historical location and the location sensitivity metric are encrypted by a homomorphic encryption scheme.

8. The apparatus as claimed in claim 6, wherein performing the authentication operation comprises:
    determining whether the current location and the historical location are within the distance as defined by the location sensitivity metric.

9. The apparatus as claimed in claim 6, wherein the historical location comprising location coordinates, and the location sensitivity metric comprising the distance, define a square; and
    wherein performing the authentication operation comprises:
        determining whether the current location is within the square.

10. The apparatus as claimed in claim 6, wherein performing the authentication operation comprises determining a risk score and forwarding the risk score for use in authentication.

11. A computer program product having a non-transitory computer readable medium which stores a set of instructions for use in fraud detection, the set of instructions, when carried out by computerized circuitry, causing the computerized circuitry to perform a method of:
    receiving an encrypted current location associated with a user;
    obtaining an encrypted historical location associated with the user and an encrypted location sensitivity metric, wherein location sensitivity metric relates to a distance within which locations are considered to be the same; and
    performing an authentication operation based on the encrypted current location, the encrypted historical location and the encrypted location sensitivity metric using a homomorphic-based order operation.

12. The computer program product as claimed in claim 11, wherein the current location, the historical location and the location sensitivity metric are encrypted by a homomorphic encryption scheme.

13. The computer program product as claimed in claim 11, wherein performing the authentication operation comprises:
    determining whether the current location and the historical location are within the distance as defined by the location sensitivity metric.

14. The computer program product as claimed in claim 11, wherein the historical location comprising location coordinates, and the location sensitivity metric comprising the distance, define a square; and
    wherein performing the authentication operation comprises:
        determining whether the current location is within the square.

15. The computer program product as claimed in claim 11, wherein performing the authentication operation comprises determining a risk score and forwarding the risk score for use in authentication.

* * * * *